US005647965A

United States Patent [19]

Crose et al.

[11] Patent Number: 5,647,965

[45] Date of Patent: Jul. 15, 1997

[54] APPARATUS AND METHOD FOR SEPARATING A CHARGED SUBSTANCE FROM A CONDUCTIVE FLUID

[76] Inventors: James R. Crose, 5 McCormick La., Chelmsford, Mass. 01824; Sol L. Berg, 11 Royal Crest Dr., N. Andover, Mass. 01845

[21] Appl. No.: 218,221

[22] Filed: Mar. 25, 1994

[51] Int. Cl.[6] .............................. B01D 35/06; B03C 5/02

[52] U.S. Cl. .......................... 204/572; 204/551; 204/553; 204/647; 204/660; 204/665; 204/671; 210/243; 210/748; 422/22; 422/44

[58] Field of Search ............................ 204/180.1, 183.1, 204/183.3, 186, 188–191, 299 R, 300 R, 302, 304–308, 551, 553, 571, 572, 647, 648, 660, 665, 671; 210/243, 748; 422/22, 44; 435/2, 173.9; 605/5

[56] References Cited

U.S. PATENT DOCUMENTS

| | | | |
|---|---|---|---|
| 3,484,362 | 12/1969 | Vroonhoven | 204/665 |
| 3,616,356 | 10/1971 | Roy | 205/688 |
| 3,766,034 | 10/1973 | Veltman | 205/746 |
| 3,891,528 | 6/1975 | Griswold | 204/562 |
| 3,980,541 | 9/1976 | Aine | 204/554 |
| 4,372,837 | 2/1983 | Watson et al. | 204/562 |
| 4,594,138 | 6/1986 | Thompson | 204/665 |
| 4,620,917 | 11/1986 | Nozawa et al. | 204/665 |
| 4,744,910 | 5/1988 | Bossard | 204/572 |
| 4,800,011 | 1/1989 | Abbott et al. | 204/665 |
| 4,886,527 | 12/1989 | Fottinger et al. | 95/78 |
| 4,917,782 | 4/1990 | Davies | 205/743 |
| 4,919,777 | 4/1990 | Bull | 204/563 |
| 4,948,515 | 8/1990 | Okumura et al. | 204/560 |
| 4,961,845 | 10/1990 | Dawson et al. | 210/85 |
| 4,975,166 | 12/1990 | Candor | 204/516 |
| 4,981,569 | 1/1991 | Schugerl et al. | 204/673 |
| 5,019,237 | 5/1991 | Briant et al. | 204/664 |
| 5,036,365 | 7/1991 | Landa | 355/256 |
| 5,039,385 | 8/1991 | Tominaga | 428/418 |
| 5,043,048 | 8/1991 | Muralidhara | 204/518 |
| 5,064,515 | 11/1991 | Harapanahalli | 204/518 |
| 5,071,532 | 12/1991 | Taillet et al. | 204/660 |
| 5,106,468 | 4/1992 | Chimenti | 204/564 |
| 5,114,553 | 5/1992 | Candor | 204/542 |
| 5,114,560 | 5/1992 | Senapti et al. | 204/629 |
| 5,122,360 | 6/1992 | Harris et al. | 423/592 |
| 5,124,012 | 6/1992 | Vomberg | 205/343 |
| 5,133,844 | 7/1992 | Stevens | 204/549 |
| 5,139,675 | 8/1992 | Arnold et al. | 210/639 |
| 5,139,684 | 8/1992 | Kaali et al. | 205/701 |
| 5,147,045 | 9/1992 | Chi et al. | 209/9 |
| 5,149,422 | 9/1992 | Barrington | 210/85 |
| 5,160,593 | 11/1992 | Candor | 204/542 |
| 5,185,086 | 2/1993 | Kaali et al. | 210/748 |
| 5,188,738 | 2/1993 | Kaali et al. | 210/748 |
| 5,217,607 | 6/1993 | Dalton, III et al. | 210/143 |
| 5,234,555 | 8/1993 | Ibbott | 422/22 |
| 5,242,587 | 9/1993 | Barrington et al. | 210/223 |
| 5,244,550 | 9/1993 | Inoue | 204/518 |
| 5,372,690 | 12/1994 | Gardner-Clayson et al. | 204/255 |

*Primary Examiner*—Kathryn L. Gorgos
*Assistant Examiner*—William T. Leader
*Attorney, Agent, or Firm*—Watov & Kipnes, P.C.

[57] ABSTRACT

Apparatus and method for removing a charged substance from a conductive fluid by imposing an electrostatic field on the conductive fluid, the charged substance being drawn to and retained by a charged substance receiving member having a core of a conductive material and a outer surface of a non-conductive material.

24 Claims, 2 Drawing Sheets

APPARATUS AND METHOD FOR SEPARATING A CHARGED SUBSTANCE FROM A CONDUCTIVE FLUID

RELATED APPLICATION

U.S. Ser. No. 08/168,956 filed Jan. 31, 1994, now U.S. Pat. No. 5,443,709, is directed to an apparatus and process for decaffeinating a caffeine-containing liquid.

FIELD OF THE INVENTION

The present invention is directed to apparatus and methods for removing a charged substance from a conductive fluid in which the charged substance is drawn towards a charged substance-receiving member by imposing an electrostatic field transverse to the direction of flow of the conductive fluid.

BACKGROUND OF THE INVENTION

Removal of particulate matter from fluids has received considerable attention in many technical areas. For example, efforts continue in the automotive industry to improve filtration for the removal of particulate matter from oil and gasoline. In the manufacturing of integrated circuits, the presence of particulate matter in processing fluids can result in defective parts. Accordingly, considerable attention has been focused on effective ways of removing any particulate matter which can precipitate on substrates such as printed circuit boards. Perhaps most significantly is the effort being made in the health care industry to screen/purify blood and other fluids which are injected into the body for possible contamination with viruses, such as Human Immunodeficiency Virus (HIV) and hepatitis, bacteria, fungi and parasites.

Particulate matter has been removed from fluids by several methods. One such method employs traditional mechanical pass through filters having preselected pore sizes to screen out particulate matter. The pore size of the filter will vary directly with the size of the particulate matter to be removed from the fluid. Such filters, however, are disadvantageous because they are non-specific as to the type of particulate matter which is removed. Once a pore size has been selected, the filter will pass all particulate matter, including both contaminants and non-contaminants, having a particle size less than the selected pore size.

Separation of particulate matter within a fluid has been established with an electrical field using field flow fractionation. Like centrifugation, field flow fractionation is an elution technique. This procedure employs the use of density differentials (e.g. sedimentation), thermal gradients and transverse electrical fields to name a few.

Each of these methods has disadvantages for use in the purification of fluids, such as in the treatment of blood plasma for the removal of harmful substances such as viruses, bacteria, fungi and parasites. In field flow fractionation techniques utilizing a transverse electrical field, the hydrodynamics of the fluid allows precipitation of larger protein particles simultaneously with the extraction of substances which are responsive to the imposed electrical field. The removal of protein particles with the desired substances adversely affects the effectiveness of the separation process and also modifies the product (e.g. blood plasma) itself.

Another separation method employs an ion-exchange column which separates materials based on their differential binding to charged surfaces in the presence of an electric current. Ion-exchange columns, however, become quickly saturated as the materials precipitate out on the electrode and therefore require frequent cleaning.

Any process including field flow fractionation, ion-exchange columns, and the like which utilizes a current flow in a conductive fluid will produce a gaseous byproduct which may remain suspended in the fluid body. With blood plasma suspended gaseous byproducts may lead to formation of an embolism within the human body.

Electrostatic devices have been proposed for removing particulate matter from dielectric or non-conductive fluids, such as petroleum products as disclosed, for example, in Van Vroonhoven, U.S. Pat. No. 3,484,362 and Watson et al., U.S. Pat. No. 4,372,837. Such electrostatic filters generally include a chamber for receiving the fluid, an electrostatic field generating assembly for generating an electrostatic field across the flowing fluid and a dielectric material within the chamber.

Such devices, while effective for removing particulate matter from non-conductive fluids are ineffective for removing particulate matter from a conductive fluid. Conductive fluids cause shorting due to the low electrical resistivity of the fluid between electrodes, thereby preventing an effective electrostatic field from forming.

It would therefore be a significant advance in the art of separating substances from a conductive fluid, to provide a device and method which can effectively perform the separation in a time and cost effective manner. A further advantage would be obtained if selective separation can be accomplished without removing desirable non-contaminants from the fluid.

SUMMARY OF THE INVENTION

The present invention provides a new and improved apparatus and method for separating a charged substance from a conductive fluid.

In its broadest aspects, the present invention is directed to a device for removing a charged substance from a conductive fluid containing the same comprising:

(a) channel means for transporting said conductive fluid to a charged substance separation means;

(b) charged substance separation means comprising, a passageway for the flow of the conductive fluid, electrostatic field generating means for generating an electrostatic field in transverse relationship to the direction of the flow through the passageway of the conductive fluid of sufficient intensity to draw the charged substance out of the direction of the flow of the conductive fluid and toward a charged substance-receiving member, and a charged substance-receiving member for receiving the charged substance from the conductive fluid and for retaining the charged substance thereon, said charged substance-receiving member comprising a core of a polarizable material and an outer surface of a dielectric material, to thereby produce a fluid having up to all of the charged substance removed therefrom.

The charged substance-receiving member is preferably comprised of a matrix of dielectric coated metallic spheres juxtaposed within an applied, radial electrostatic field positioned transverse to the flow of a conductive fluid. The spheres are polarizable in that during operation of the present device they have both positive and negative charged surfaces.

As the conductive fluid flows through the matrix formed by the metallic spheres, the charged substance is carried into the electrostatic field generated by the electrostatic field generating means. Because of the inherent electrostatic charge of the charged substance, it is driven towards, as well as attracted to the appropriate charged surfaces of the matrix of metallic spheres. Accordingly, it is the electrostatic field produced in accordance with the present invention that makes possible the extraction of charged substances (e.g. viruses) in the presence of relatively large interstitial clearances between the spheres comprising the matrix. Each sphere accepts a proportionate share of the impressed voltage and represents by induction individual charged collectors of the charged substance. As the size of the spheres is reduced, the degree of polarization increases as well as the available surface area for collecting the charged substance. Interstitial clearances between the spheres permits the larger charged substances to readily pass but is sufficient to retain smaller charged substances. By selecting suitably sized spheres, the present device can be used to separate both large and small charged substances.

BRIEF DESCRIPTION OF THE DRAWINGS

The following drawings in which like reference characters illustrate like parts, are illustrative of embodiments of the invention and are not intended to limit the invention as encompassed by the claims forming part of the application.

DETAILED DESCRIPTION OF THE INVENTION

The present invention is directed to a device and method for removing a charged substance from a conductive fluid. An electrostatic field is employed to attract and draw the charged substance from the conductive fluid and to retain the charged substance on a charged substance receiving member. This member is comprised of a core of a polarizable material having an outer surface composed of a dielectric material. In the presence of an electrostatic field, the charged substance receiving member draws and retains the charged substance present in the conductive fluid thereon, allowing the conductive fluid, at least substantially free of the charged substance, to pass through the apparatus.

The present invention is applicable to all conductive fluids containing a charged substance. Without limitation, the present invention can be used to separate charged substances from waste streams, water supplies, ingestible liquids, such as caffeine-containing liquids, biological fluids such as blood plasma and the like.

The present invention is especially useful for removing pathogenic organisms such as viruses, bacteria, fungi and parasites from conductive biological fluids such as blood plasma. Cellular components caused by or containing pathogens may also be removed from such fluids. The present invention is particularly adapted to removing infected lymphocytes, T-cells or macrophages from the blood plasma of persons having AIDS. Other complicating factors from autoimmune diseases such as immune complexes or rheumatoid factor may likewise be removed.

The pathogenic organisms which may be contained within blood plasma are extracted as the blood plasma flows through the matrix of spheres by the imposition of an electrostatic field. Because these pathogenic organisms have an inherent electrostatic charge they are drawn toward the appropriately charged surfaces of the spheres. Longer protein molecules readily pass through the device but ruptured red and white cells that occur during the initial fractionation of whole blood are retained.

The collection capability of the spheres of the matrix may be enhanced when processing blood plasma by adding a binding agent to the dielectric coating. Suitable binding agents are those having an affinity for binding to the charged substance which is to be removed from the conductive fluid. For example, when attempting to remove HIV or Simian Virus (SIV) from blood plasma, the spheres may be coated with cloned CD4.

The device of the present invention may be used for multiple separation runs after appropriate sterilization and/or cleaning procedures. However, it will be appreciated that when used to treat biological fluids such as blood plasma, the device is intended to be used only once and then disposed of in an appropriate manner.

Figure 1:
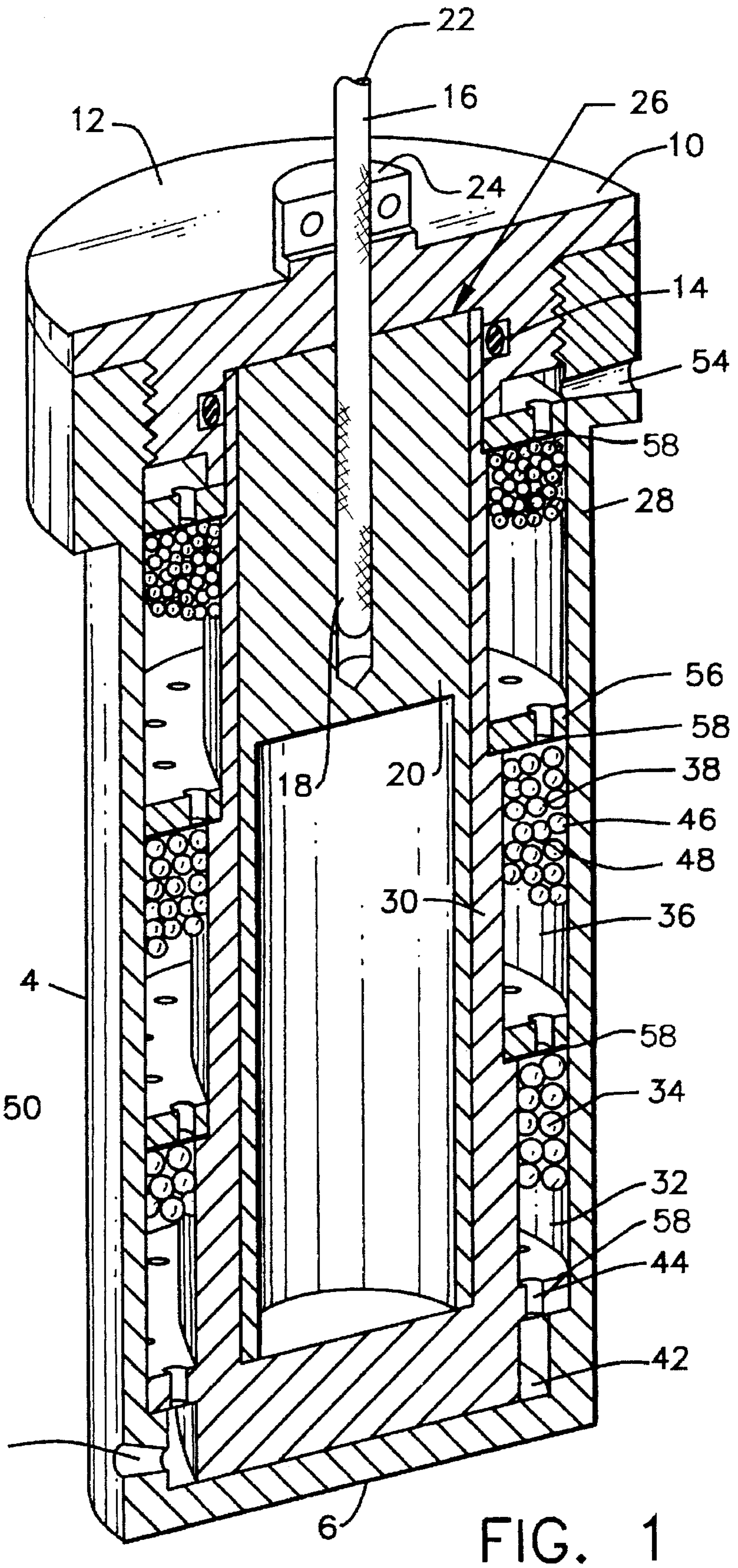
FIG. 1 is a front elevational view in cross-section of one embodiment of the invention employing a permanent power source.

Referring to the drawings and in particular to FIG. 1 there is shown an embodiment of the present invention for removing a charged substance, such as a virus from a conductive fluid, such as blood plasma. While reference herein, for exemplary purposes only, will be made to the separation and removal of a virus from blood plasma, it should be understood that the invention embraces the removal of charged substances generally from conductive fluids.

The device of the present invention is shown generally by the numeral 2 and includes a grounded case or housing 4 having a base 6 and an upper end 8 comprised on an end cap 10 having an outer surface 12. The end cap 10 is secured to the device 2, for example, by a threaded connection internal with the housing 4. A sealing device 14 such as an O-ring prevents the conductive fluid from short circuiting the electrostatic field.

Extending through the cap 12 is a high voltage lead 16 having a first end 18 in electrical contact with an inner electrode 20 and a second end 22 connected to a permanent D.C. power source (not shown). The lead 16 is held in its operable position by a clamp 24 affixed to the outer surface 12 of the end cap 10.

The device 2 includes an electrostatic field generating assembly 26 including the inner electrode 20 and a spaced apart outer electrode 28. Adjacent to the inner electrode 20 is an insulator 30. The insulator 30 has sufficient insulating properties so as to prevent the flow of an electric current between the inner and outer electrodes 20, 28, yet permits the generation of an electrostatic field in a transverse relationship to the flow of the conductive fluid as explained hereinafter.

The device 2 also includes a pathway 32 for the flow of the conductive fluid through the device. Associated with the pathway 32 is a separation means 34 including at least one chamber 36 containing a charged substance receiving member 38 as well as the electrostatic field generating assembly 26.

Fluid enters the device 2 through an inlet 40, preferably positioned at the base 6 of the housing 4. The inlet 40 is in fluid communication with an annular conduit 42 which enables the fluid to flood the circumference of the conduit 42 and be ready for entry into the pathway 32.

The inlet is preferably positioned at the base 6 so as to utilize the capillary action of the conductive fluid to fully wet the charged substance receiving member 38 and to displace the air present above the conductive fluid as it rises within the device 2.

The chamber 36 has a plurality of passageways 44 for receiving the conductive fluid from the annular conduit 42. Contained within the chamber 36 is the charged substance receiving member 38 which is adapted to receive the charged substance from the fluid and retain the same while the conductive fluid, substantially devoid of the charged substance, passes through the chamber 36. The charged substance receiving member 38 is capable of being polarized so as to generate individual charged sites which attract and draw the charged substance away from the direction of flow of the conductive fluid.

In a preferred embodiment of the invention, the charged substance receiving member 38 comprises a plurality of individual but closely packed spheres 46 forming interstitial voids 48 therebetween. The voids 48 define a serpentine pathway through which the conductive fluid flows while the charged substance is being drawn and retained by the spheres 46.

The charged substance receiving member 38 as represented by the spheres 46 is polarizable, yet has a dielectric or non-conductive outer surface so as to prevent shorting when the electrostatic field is imposed.

Figure 2:
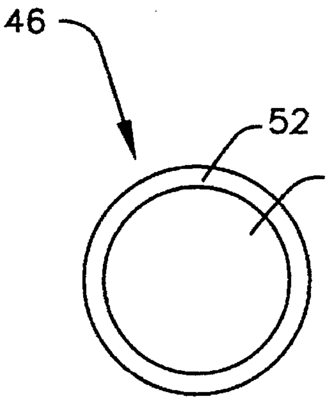
FIG. 2 is a cross-sectional view of a preferred embodiment of the charged substance receiving member for attracting and retaining particulate matter from a fluid.

Referring to FIG. 2, the spheres 46 comprise a conductive core 50 and a non-conductive or dielectric outer surface 52. The core 50 is preferably made of a ferrous metal including iron or steel, most preferably iron. The dielectric material for the outer surface 52 is selected from such materials as Teflon (registered trademark of DuPont), latex, polystyrene or a similar chemically inert material. A preferred material for the outer surface 52 of the spheres 46 is Teflon.

The spheres 46 may be provided with an appropriate binding agent having an affinity for binding to the charged substance of interest. For example, since all strains of HIV, HIV-2 and Simian Virus (SIV) found within blood plasma preferentially infect a subgroup of T-cells, which is defined by a surface antigen called CD4, the spheres 46 may be further coated with CD4 to further enhance the removal of the specific charged substance contained with the infected sample of blood plasma.

The spheres 46, when in the presence of an electrostatic field imposed by the electrostatic field generating means 26, become polarized by reducing dipole moments within the iron core 50. As a consequence, parts of the surface area of the core 50 become charged positive and other parts become charged negative thereby attracting a designated charged substance of either polarity to a specific area on the sphere having the opposite polarity. The spheres 46 which occupy the chamber 36 as shown specifically in FIG. 1 serve to form a three-dimensional charged substance-receiving matrix having a large surface area adapted to readily accept the charged substance from a conductive fluid.

The overall length of the device 2 may vary. With regard to the treatment of blood plasma, the length of the device is a function of the empirical viral population ratio (number of virus/number of voids), the size of the spheres used to generate the required number of voids (voids size chosen to pass the largest protein particle contained within the conductive fluid), and the active surface area (a fraction of the total surface area of a sphere). The diameter of the device 2 is a function of the required rate of flow of the conductive fluid and the annular void fraction of the matrix of spheres 46 positioned between the electrodes 20 and 28. A preferred diameter for the dielectric coated sphere is from about 50 to 100 microns.

The flow path through the matrix of spheres is serpentine. The volume of the interstitial voids and therefore the dimensions of the serpentine pathway will vary according to the diameter of the spheres. In particular, the smaller the diameter of the spheres the smaller the volume of the interstitial voids, although the total number of voids will increase. As the overall volume of the interstitial voids decreases, a corresponding reduction in the flow rate per void increases the exposure time of the charged substance to the electrostatic field of the individual charged substance receiving members. As a result there is a corresponding reduction in the velocity of the conductive fluid. Any reduction in velocity reduces the hydrodynamic forces of the conductive fluid which correlates to a more effective separation of the charged substance.

The electrostatic field generating assembly 26 generates an electrostatic field at substantially right angles to the direction of flow of the conductive fluid through the serpentine pathway. As used herein the expression "generating an electrostatic field at substantially right angles to the direction of flow of the conductive fluid" shall mean an electrostatic field which slows the velocity of the charged substance relative to the velocity of the conductive fluid and draws the charged substance towards the spheres 46.

The electrostatic field generating assembly 26 includes the inner and outer electrodes 20, 28 which are separated from each other by an insulator 30. The placement of the electrodes 20, 28 and the operation of the electrostatic field generating assembly 26 prevents electric current from flowing between the electrodes 20, 28, thereby eliminating the possibility of any gaseous by product being retained by the conductive fluid. When the conductive fluid is blood plasma, the elimination of gaseous byproducts reduces the threat of an embolism within a patient.

In accordance with the present invention, the electrodes 20, 28 are sufficiently insulated from each other so that a high voltage impressed upon the inner electrode 20 will generate an electrostatic field of sufficient magnitude to increase the extraction rate of the charged substance and draw the charged substance out of the flow of the conductive fluid toward the spheres 46. In a preferred embodiment of the invention, the electrostatic field is generated in a manner which operates in a transverse relationship to the flow of the conductive fluid as previously defined which provides for the maximum extraction of the charged substance.

The electrodes 20, 28 are generally fabricated from any suitable metallic materials. For blood plasma or other medical applications the electrodes 20, 28 are preferably fabricated of stainless steel.

The inner electrode 20 is connected to a power supply (not shown) through the high voltage lead 16 and the outer electrode 28 which serves as a ground electrode is also connected to the power supply in a conventional manner, though not shown.

The degree to which the designated charged substance will be removed from the conductive fluid is partially dependent on the intensity of the electrostatic field. The electrostatic field intensity is influenced by the distance between the inner and outer electrodes 20, 28, the thickness of the insulator 30 separating the electrodes 20, 28, the applied voltage, and the number/size of the charged substance receiving members 38. Generally, the closer the electrodes 20, 28 are together, the greater the intensity of the electrostatic field. In a preferred form of the invention, the electrodes are spaced apart by a distance of from about 0.025 to 0.040 inch.

The thickness of the insulator 30 can be varied to help achieve the desired intensity of the electrostatic field. Generally, the thicker the insulator 30 positioned between the inner and outer electrodes 20, 28, the lower the intensity of the electrostatic field across the conductive fluid. The thickness of the insulator 30 for most applications is typically in the range of from about 0.010 to 0.060 inch. It should be understood that the thickness of the insulator 30 may vary within the device 2. As shown in FIG. 1 and as more specifically described hereinafter the thickness of the insulator decreases from the inlet 40 of the device to an outlet 54.

The intensity of the electrostatic field may also be varied by varying the voltage supplied to the electrodes. The greater the voltage, the greater will be the intensity of the electrostatic field. From about 1,000 to 6,000 volts is suitable for removing most charged substances from conductive fluids. A voltage in the range of from about 1,000 to 3,000 volts is desirable for removing pathogenic organisms (e.g. viruses, bacteria, fungi, parasites and the like) from blood plasma.

The presence of the dielectric coated spheres 46 creates individual electrostatic fields within the chamber 36 in close proximity to the charged substance to thereby improve the efficiency of separation and collection. The spheres 46 also serve to increase the residence time of the conductive fluid within the overall electrostatic field between the electrodes 20 and 28.

The device 2 may contain more than one chamber 36, with each chamber housing a charge receiving member 38. Each chamber 36 may contain the same size spheres 46 as the other chambers or may contain different sized spheres as explained hereinafter.

Referring specifically to FIG. 1, three chambers 36, **36*a* and 36*b* are shown. The respective chambers are separated from each other by a flow distribution plate 56 and a fine meshed screen 58, adjacent thereto. The flow distribution plate 56 improves the capillary action of the conductive fluid so as to fully wet the matrix of spheres and also serves to support the weight of the spheres 46. The fine meshed screen 58 prevents the migration of the spheres 46** between individual chambers as well as confining them within the apparatus.

The chambers 36, **36*a* and 36*b* may each contain the same size spheres or different sized spheres 46, 46*a* and 46*b***. The same size spheres are preferably used to remove a single type of charged substance. Different size spheres are preferably employed particularly when it is desirable to remove multiple types of charged/non-charged substances. When whole blood is initially fractionated, red and white cells as well as platelets are removed by centrifuging. The resulting blood plasma contains ruptured cell fragments due to centrifuging which should be removed to prevent toxic shock to the recipient. The construction of the present device removes by mechanical means the relatively large ruptured cell fragments associated with the prior fractionation process. Concurrently, the separation process continues in the removal of the charged substances. Should too fine a sphere size be selected, flow blockage from the debris of the initial whole blood fractionation process could occur and the separation process terminated.

As the conductive fluid is exposed to each successive chamber 36, **36*a* and 36*b*, respectively, ions within the conductive fluid are electrostatically removed (i.e., the conductivity of the fluid is reduced). A reduction in the conductivity of the fluid permits an increase in voltage to occur. Step-wise reductions in the insulation value of the insulator 30 from the inlet 40 to the outlet 54 accommodates the reduction in ions. This permits corresponding step-wise increases in voltage to occur thereby increasing the collection efficiency of the charged substances. Thus the device 2 can be constructed to remove principally a single type of charged substance utilizing one chamber or multiple types of charged substances utilizing multiple chambers in fluid communication as shown specifically in FIG. 1**.

Once the conductive fluid has been treated in accordance with the present invention and the designated charged substances removed, the conductive fluid leaves the device 2 through the outlet 54 for further processing and/or storage or packaging.

The device 2 of the present invention may be made portable by incorporating a portable power supply such as a battery. The portable device may be carried to remote locations where permanent power sources are inconvenient or unavailable. Referring the FIG. 3, there is shown a device 2 of the present invention, similar to the embodiment shown in FIG. 1 employing a battery as the power source. A battery 60 is connected to an external switch 62 via a lead wire 64 mounted on a ground cap 66. Upon closure of the external switch 62 the battery circuit is completed energizing the DC—DC converter which generates the required voltage which in turn is impressed upon electrode 20.

Figure 3:
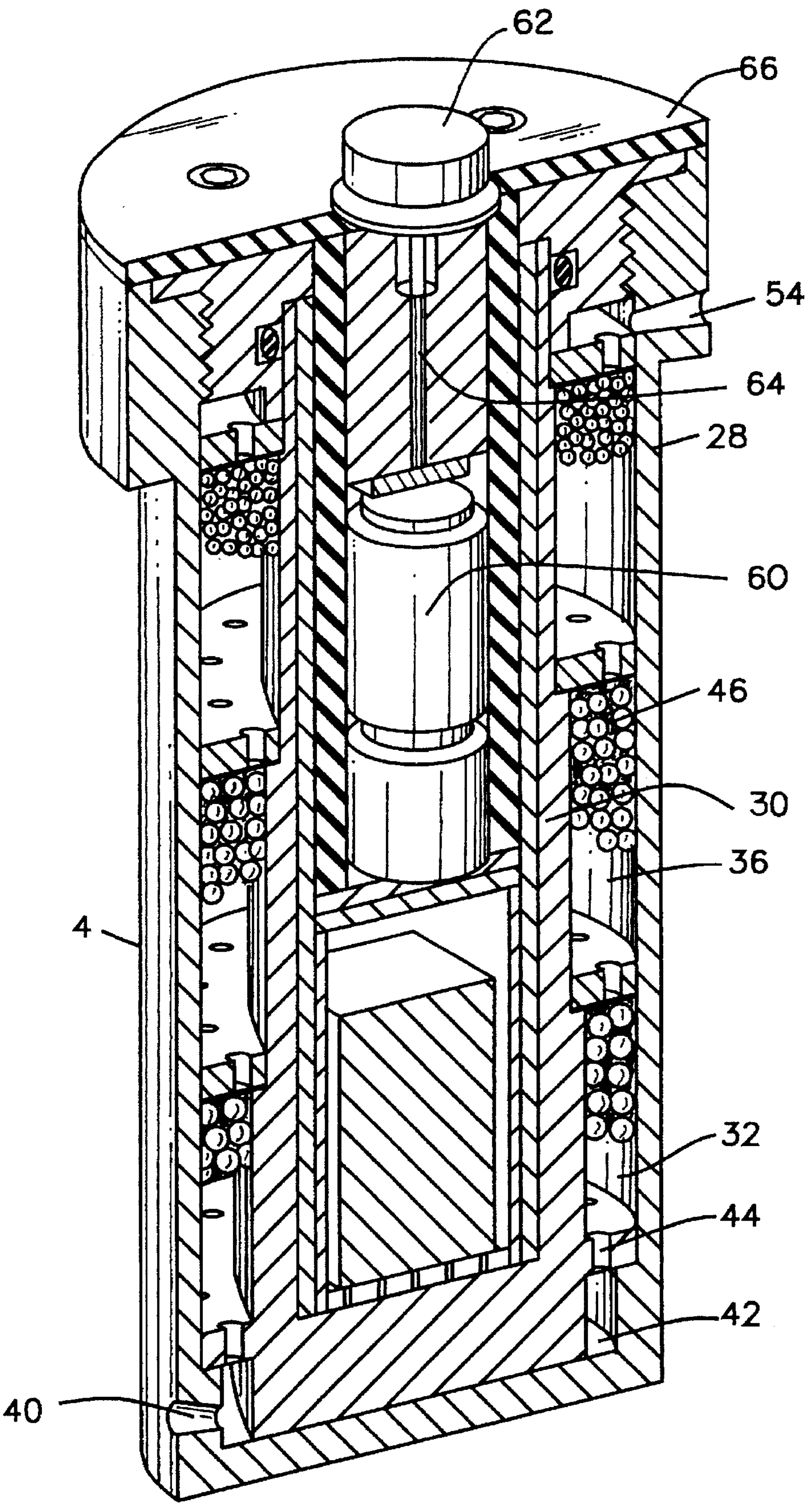
FIG. 3 is a front elevational view in cross-section of another embodiment of the invention employing a portable power source.

In the operation of the device 2 shown in FIGS. 1 and 3 the power source is engaged and the conductive fluid is passed into the device 2 via the inlet 40 and the annular conduit 42. As the conductive fluid rises in the single chamber 36 or the multiple chambers 36, **36*a* and 36*b*, an electrostatic field is imposed transverse to the flow of the conductive fluid. The electrostatic field produces an electrical force which tends to modify the dominant hydrodynamic flow forces applied to the charged substance as it proceeds into and through the chamber. The electrostatic field, the intensity of which is controlled by the applied voltage, the distance between the electrodes and the amount of insulation between the electrodes, draws the charged substance towards the matrix of spheres 46. The charged substance is retained on the spheres allowing the conductive fluid, absent the charged substance, to flow out of the outlet 54**.

EXAMPLE

Blood plasma was obtained from a person known to test positive for Hepatitis B antigen. The blood plasma was separated from the other blood components by centrifugation and stored frozen at −20° C. for approximately five days. The blood plasma was thawed to room temperature and kneaded to remix the concentrated cryogen back into solution within the plasma bag to prepare the blood plasma for separation using the device of the present invention.

Approximately 280 ml of the blood plasma was suspended in a plasma bag at a height of about 30 inches above a single stage separation device of the type shown and described in connection with FIG. 1. The plasma bag was connected to a standard drip chamber and intravenous tubing was connected to the inlet of the separation device. A similar intravenous tubing was connected via a three-way stopcock to the outlet of the separation device.

The high voltage and ground wires were attached and the power supply voltage was set at 6,000 volts. The separation process was begun by first applying the voltage and establishing the electrostatic field. After establishing the electrostatic field, the blood plasma was caused to flow from the plasma bag into the separating device at the rate of 10 drops/min. Approximately 20 ml was collected and divided among several test tubes.

A control specimen and test specimens prepared above were tested for whole virus and viral DNA specific for Hepatitis B by assaying the specimens in a dot blot radioactive test. The control specimen, which was not treated by the separation device of the present invention, exhibited a relatively high concentration of viral DNA associated with Hepatitis B. The specimens treated by the separation device of the present invention showed a significant reduction in the presence of the infected DNA.

What is claimed is:

1. A device for removing a charged substance from a conductive fluid containing the same comprising:

(a) channel means for transporting said conductive fluid to a charged substance separation means having an inlet;

(b) charged substance separation means comprising, at least one chamber defining a passageway for the flow of the conductive fluid from said inlet to an outlet, electrostatic field generating means for generating an electrostatic field in transverse relationship to the direction of the flow through the passageway of the conductive fluid of sufficient intensity to induce a charge on a charged substance-receiving means and to draw the charged substance out of the direction of the flow of the conductive fluid and to a charged substance-receiving means, said electrostatic field generating means comprising power supply means, and at least first and second electrodes spaced apart from each other and insulation means in proximity to one of said electrodes for insulating the electrodes to an extent sufficient to prevent an electrical current from flowing therebetween, and a charged substance-receiving means comprising a matrix of members contained within said at least one chamber and capable of being charged by said electrostatic field generating means and packed together with interstitial voids therebetween forming a serpentine pathway for receiving the charged substance from the conductive fluid and for retaining the charged substance thereon, said members comprising a core of an electrically polarizable material and an outer surface of a dielectric material, said charged substance receiving means positioned between said pair of electrodes to thereby produce a fluid having up to all of the charged substance removed therefrom.

2. The device of claim 1 wherein the matrix of members is a matrix of spheres.

3. The device of claim 2 wherein each sphere contained within each chamber has the same diameter.

4. The device of claim 3 wherein the core of each sphere is composed of a ferrous material and the dielectric coating thereon is selected from the group consisting of polytetrafluoroethylene, latex and polystyrene.

5. The device of claim 2 comprising at least two chambers in fluid communication, wherein the spheres in each chamber are of a different diameter than the spheres in each other chamber.

6. The device of claim 5 comprising a first chamber for receiving the conductive fluid from the inlet and a second chamber from which the conductive fluid having up to all of the charged substance removed therefrom is sent to the outlet, said first chamber having insulation separating the first and second electrodes of greater thickness than the insulation between the first and second electrodes in the second chamber.

7. The device of claim 6 comprising at least three chambers extending from the inlet to the outlet each succeeding chamber from the inlet having less insulation between the first and second electrodes.

8. The device of claim 2 wherein the matrix of spheres further comprises a binding agent having an affinity for binding to the charged substance.

9. The device of claim 2 wherein the diameter of the spheres is in the range of from about 50 to 100 microns.

10. The device of claim 1 wherein the distance between the first and second electrodes is from about 0.025 to 0.040 inch.

11. The device of claim 1 wherein the thickness of the insulation means is from about 0.010 to 0.060 inch.

12. The device of claim 1 wherein the power supply means is capable of generating from about 1,000 to 6,000 volts.

13. The device of claim 1 wherein the power supply means is portable.

14. A device for removing a charged substance from a conductive fluid containing the same comprising:

(a) channel means for transporting said conductive fluid to a charged substance separation means having an inlet;

(b) charged substance separation means comprising, at least two chambers in fluid communication defining a passageway for the flow of the conductive fluid from said inlet to an outlet;

electrostatic field generating means comprising a first electrode connected to a power supply means, a second electrode spaced apart from the first electrode and having insulation therebetween wherein the first and second electrodes are adapted, in conjunction with the power supply means, to generate said electrostatic field in transverse relationship to the direction of the flow through the passageway of the conductive fluid of sufficient intensity to draw the charged substance out of direction of the flow of the conductive fluid and to a charged substance receiving means; and charged substance-receiving means positioned between said first and second electrodes comprising a matrix of spheres contained within at least said at least two chambers and packed together with interstitial voids therebetween forming a serpentine pathway for receiving the charged substance from the conductive fluid and for retaining the charged substance thereon, said matrix of spheres contained within each chamber having a different diameter than the matrix of spheres in each other chamber, each sphere comprising a core of a polarizable material and an outer surface of a dielectric material, to thereby produce a fluid having up to all of the charged substance removed therefrom.

15. A method for removing a charged substance from a conductive fluid containing the same comprising:

(a) transporting the conductive fluid containing said charged substance through a serpentine pathway of a charged substance receiving means, said charged substance receiving means comprising a plurality of members forming interstitial voids therebetween defining said serpentine pathway, said members being contained within at least one chamber and comprising a core of an electrically polarizable material and an outer surface of a dielectric material; and (b) generating an electrostatic field between at least one pair of spaced apart electrodes having sufficient insulation therebetween to prevent the flow of an electric current, while inducing a charge on said members, said electrostatic field being generated in transverse relationship to the direction of flow of the conductive fluid through said serpentine pathway of sufficient intensity to draw the charged substance out of the direction of the flow of the conductive fluid and to said members, and retaining the charged substance on said members, thereby removing the charged substance from the conductive fluid.

16. The method of claim 15 comprising generating said electrostatic field by providing from about 1,000 to 6,000 volts from a power source to said electrodes.

17. The method of claim 15 wherein the plurality of members comprises a plurality of spheres.

18. The method of claim 17 wherein each sphere contained within each chamber has the same diameter.

19. A method for removing a charged substance from a conductive fluid containing the same comprising:

(a) transporting the conductive fluid containing said charged substance through a serpentine pathway formed by interstitial voids between a matrix of spheres within at least two chambers, with the spheres in one chamber having a different diameter than the spheres each other chamber, said spheres comprising a core of an electrically polarizable material and an outer surface of a dielectric material; and (b) generating an electrostatic field in transverse relationship to the direction of flow of the conductive fluid through said serpentine pathway of sufficient intensity to draw the charged substance out of the direction of the flow of the conductive fluid and to the spheres in said at least two chambers, and retaining the charged substance on the spheres, thereby removing the charged substance from the conductive fluid.

20. A method for removing a charged substance from blood plasma comprising:

(a) transporting the blood plasma containing said charged substance through a serpentine pathway formed by interstitial voids between a matrix of members within at least one chamber, said members comprising a core of an electrically polarizable material and an outer surface of a dielectric material; and (b) generating an electrostatic field in transverse relationship to the direction of flow of the blood plasma through said serpentine pathway of sufficient intensity to draw the charged substance out of said direction of the flow of the blood plasma and to the matrix of members in said at least one chamber, and retaining the charged substance on said members, thereby removing the charged substance from the blood plasma.

21. The method of claim 20 wherein the charged substance is selected from the group consisting of viruses, bacteria, fungi and parasites.

22. The method of claim 21 wherein the virus is Human Immunodeficiency Virus.

23. The method of claim 20 wherein the matrix of members comprises a plurality of spheres and further comprising coating the spheres with a binding agent having an affinity for binding to the charged substance.

24. The method of claim 20 comprising generating said electrostatic field by providing from about 1,000 to 3,000 volts from a power source to a first electrode insulated from and spaced apart from a second electrode, said blood plasma flowing between the first and second electrodes.

* * * * *

UNITED STATES PATENT AND TRADEMARK OFFICE

CERTIFICATE OF CORRECTION

PATENT NO. : 5,647,965

DATED : July 15, 1997

INVENTOR(S) : James R. Crose and Sol L. Berg

It is certified that error appears in the above-indentified patent and that said Letters Patent is hereby corrected as shown below:

Column 1, line 6, after the word "filed" delete [January 31, 1994 and insert — December 17, 1993— therefor.

Column 1, line 8, after the word "liquid" insert —, and incorporated herein by reference—.

Signed and Sealed this

Fifteenth Day of February, 2000

*Attest:*

Q. TODD DICKINSON

*Attesting Officer*

*Commissioner of Patents and Trademarks*